(12) United States Patent
Kast et al.

(10) Patent No.: US 11,327,474 B2
(45) Date of Patent: May 10, 2022

(54) METHOD FOR MANUFACTURING OR MACHINING A PRODUCT, AND CONTROL DEVICE FOR CONTROLLING A PRODUCTION SYSTEM

(71) Applicant: Siemens Aktiengesellschaft, Munich (DE)

(72) Inventors: Bernd Kast, Ichenhausen (DE); Sebastian Albrecht, Hallbergmoos (DE); Wendelin Feiten, Neubiberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/258,239

(22) PCT Filed: Jul. 30, 2018

(86) PCT No.: PCT/EP2018/070614
§ 371 (c)(1),
(2) Date: Jan. 6, 2021

(87) PCT Pub. No.: WO2020/025103
PCT Pub. Date: Feb. 6, 2020

(65) Prior Publication Data
US 2021/0247750 A1     Aug. 12, 2021

(51) Int. Cl.
*G05B 19/418*     (2006.01)

(52) U.S. Cl.
CPC ... *G05B 19/41885* (2013.01); *G05B 19/4183* (2013.01); *G05B 19/41865* (2013.01)

(58) Field of Classification Search
CPC ........ G05B 19/41885; G05B 19/41865; G05B 19/4183
See application file for complete search history.

(56) References Cited

U.S. PATENT DOCUMENTS

| 2001/0014836 A1 | 8/2001 | Tamaki |
| 2007/0219656 A1* | 9/2007 | Rothenburg ..... G06Q 10/06395 700/97 |
| 2007/0260499 A1 | 11/2007 | Greef et al. |

FOREIGN PATENT DOCUMENTS

| CN | 105549548 A | 5/2016 |
| EP | 3343476 A1 | 7/2018 |

(Continued)

OTHER PUBLICATIONS

International Search Report dated Apr. 23, 2019 for PCT/EP2018/070614.

(Continued)

*Primary Examiner* — Christopher E. Everett
(74) *Attorney, Agent, or Firm* — Schmeiser, Olsen & Watts LLP (57) ABSTRACT

Producing a product, differently detailed structural information about a structure of the product and digital machining information about a machining process are read in. The structural information is examined as to whether a respective item of structural information is given further detail by a respective other structure. A plurality of machining sequences are generated from the structural information and machining information so that an item of structural information from a first machining sequence is given detail by an item of structural information from a second machining sequence. The first machining sequence is transmitted to a first planning module and the second machining sequence is transmitted to a second planning module. The planning modules generate an action sequence as a planning result, which is considered by the second planning module during generation of the action sequence. Control signals are output by the action sequence generated by the second planning module.

15 Claims, 3 Drawing Sheets

(56) References Cited

FOREIGN PATENT DOCUMENTS

| JP | H1080842 A | 3/1998 |
| JP | H11195064 A | 7/1999 |
| JP | 2013073511 A | 4/2013 |
| WO | 2018050252 A1 | 3/2018 |

OTHER PUBLICATIONS

Chinese Office Action dated Aug. 3, 2021 for Application No. 201880096165.X.

* cited by examiner

METHOD FOR MANUFACTURING OR MACHINING A PRODUCT, AND CONTROL DEVICE FOR CONTROLLING A PRODUCTION SYSTEM

CROSS-REFERENCE TO RELATED APPLICATIONS

This application claims priority to PCT Application No. PCT/EP2018/070614, having a filing date of Jul. 30, 2018, the entire contents of which are hereby incorporated by reference.

FIELD OF TECHNOLOGY

The following relates to a machining a product and a control device for controlling a production system.

BACKGROUND

Modern production systems for producing or machining technical products normally have many interacting production modules, such as for example robots, CNC machines, 3D printers, reactors, burners, heating installations or conveyor belts, that perform a multiplicity of machining and handling steps on the product.

Planning a production process for a product requires the actions of the production modules to be coordinated with one another and optimized in respect of stipulated criteria. A frequent aim for modern production systems is for different products or different variants of products to be able to be manufactured or machined in as short a time as possible. However, any change normally requires fresh coordination and optimization of the required action sequences for the production modules involved.

To assist in planning, specialized planning programs are now available that can be used to generate suitable action sequences for production modules on the basis of specific planning tasks. Such planning tasks can be conveyed in a machine-readable manner, for example by suitable description languages such as PDDL (Planning Domain Definition language) or OWL (Web Ontology Language), and processed in automated fashion. The available planning programs normally each specialize in a stipulated planning level or planning domain, such as for example planning on a symbolic level by PDDL or OWL or specific planning, such as for example movement planning. There is normally no provision for automatic, cross-domain coordination or optimization of action sequences, however, but rather this is often performed manually by experts. This is very complex, however, in particular when products or product variants are frequently changing.

SUMMARY

An aspect relates to a computer-aided method for producing or machining a product and a control device for controlling a production system that allow planning effort and/or production effort to be reduced.

According to embodiments of the invention a product is manufactured or machined by a production system by virtue of differently detailed, digital structural statements about a structure of the product or of a precursor and digital machining statements about a machining process for the product or for a precursor being read in. A precursor in this context is intended to be understood to mean in particular a preliminary stage or a preliminary state of the product or of a product part, a starting product, an intermediate product, a partial product or a product part available at the beginning of production or a preliminary stage of the product, generally a production state preceding the finished product. The structural statements are checked to determine whether a respective structural statement is provided with further detail by a respective other structural statement. Furthermore, multiple machining sequences for the product are generated from the structural statements and machining statements such that a structural statement comprising a first machining sequence is provided with further detail by a structural statement comprising a second machining sequence. The first machining sequence is then transmitted to a first planning module and the second machining sequence is transmitted to a second planning module. The planning modules each use the received machining sequence to generate an action sequence as a planning result, a planning result of the first planning module being taken into consideration by the second planning module when generating its action sequence. The action sequence generated by the second planning module is used to generate and output control signals for controlling the production system.

To perform the method according to embodiments of the invention there is provision for a control device, a computer program product (non-transitory computer readable storage medium having instructions, which when executed by a processor, perform actions) and a computer-readable storage medium.

The method according to embodiments of the invention and the control device according to embodiments of the invention can be performed or implemented for example by one or more computers, processors, application-specific integrated circuits (ASICs), digital signal processors (DSPs) and/or what are known as "field programmable gate arrays" (FPGAs).

An advantage of embodiments of the invention can be seen in particular in that breaking down the full planning problem into multiple planning subproblems frequently allows the processing effort required for the planning to be significantly reduced. In many cases this allows planning in real time during production. The cross-planning-module consideration of planning results allows cross-domain action optimization to be achieved. Furthermore, identical models and hence standard interfaces can frequently be used for production planning and for production control.

According to one advantageous embodiment of the invention the structural statements can be stored as nodes in one or more digital structure graphs. A digital graph is intended to be understood here and below to mean in particular a digital data structure having nodes and references to nodes, referred to as edges. A structure graph can recursively indicate how a product or a product structure is made up of partial structures. As such, for example a product structure in the structure graph can be specified by a node that refers to subnodes that each specify a partial structure of this product structure. A structure graph may be realized as a tree graph, in particular.

According to a further embodiment of the invention the check to determine whether a first structural statement is provided with further detail by a second structural statement can involve checking whether a partial structure graph based on the node of the first structural statement contains a partial structure graph based on the node of the second structural statement. Alternatively or additionally it is possible to check whether the node of the second structural statement succeeds the node of the first structural statement in a structure graph in respect of the reference structure thereof. The above checks can be implemented in a simple manner.

Furthermore, the structural statements can each comprise an attribute that indicates a degree of detailing or degree of generalization. The check to determine whether a respective structural statement is provided with further detail by a respective other structural statement can then be performed on the basis of the attributes.

Advantageously, the structural statements and the machining statements can each be stored as nodes in a digital production graph such that a respective structural statement that provides a respective other structural statement with further detail succeeds the other structural statement in the production graph in respect of the reference structure thereof. Such a production graph allows machining and/or manufacturing steps for the product to be specified and organized in a flexible manner on different detailing levels.

The machining sequences can each be generated as a partial graph of the production graph. To this end the production graph can be segmented into partial graphs.

According to one advantageous embodiment of the invention target structural statements that each specify a target state of the product can be selected from the structural statements. The machining sequences can then be generated such that a target structural statement comprising the first machining sequence is provided with further detail by a target structural statement comprising the second machining sequence. For this purpose it is possible for target structural statements from different branches of the production graph to be compared and for this to be taken as a basis for selecting and providing a group of target structural statements on different detailing levels.

The generating of a respective machining sequence can involve this machining sequence being progressively assigned at least one structural statement and at least one machining statement based on a respective target structural statement, the statements specifying a conversion of at least one precursor into the respective target state by at least one machining process.

The generation of a respective machining sequence can be terminated as soon as all starting points for the machining sequence comprise only stipulated starting materials. This allows machining sequences to be generated on different detailing levels that each specify a complete production path from the starting materials to the end product.

According to advantageous embodiments of the invention a planning result of the second planning module can be rated on the basis of a stipulated criterion. This rating can then be taken as a basis for prompting the first planning module to generate a new action sequence and/or for prompting a new machining sequence to be generated. The criterion used can be for example a time requirement, a resource consumption, a material consumption, a wear or emissions from the production cycle that is caused by the planning result. This kind of dynamic regeneration of action sequences or machining sequences allows the machining to be flexibly matched to changing production conditions.

Furthermore, there may be provision that if a planning module or a hardware driver of the production system reports an error then a new machining sequence is generated taking into consideration the error. This allows errors during the production cycle to be avoided independently in many cases.

According to further advantageous embodiments of the invention the generated action sequences can each be output, in particular visualized, together with an associated detailing statement. This allows current planning results to be presented in a manner specific to detailing levels, which simplifies monitoring of the production system by a user.

BRIEF DESCRIPTION

Some of the embodiments will be described in detail, with references to the following Figures, wherein like designations denote like members, wherein.

DETAILED DESCRIPTION

Figure 1:
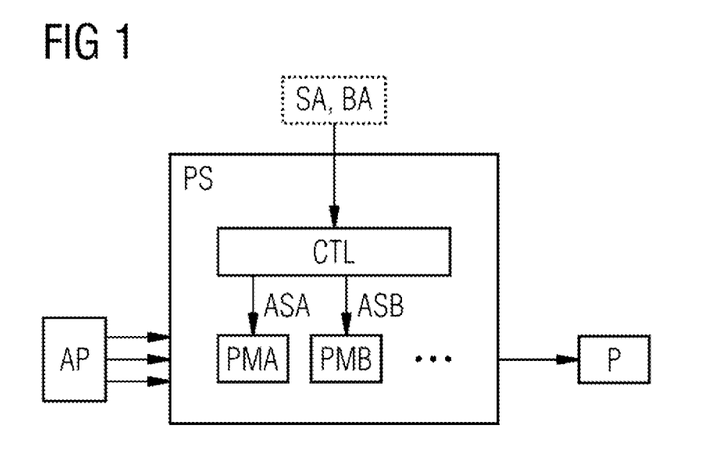
FIG. 1 shows a production system for manufacturing products.

FIG. 1 shows a production system PS, for example a production installation for manufacturing different products, in a schematic depiction. In the present exemplary embodiment the production system PS is intended to manufacture or machine a product P, for example a motor, a motor vehicle, a subassembly, an electronic circuit, a processor, a tool or another mechanical, chemical and/or electronic product.

The production system PS has a multiplicity of production modules PMA, PMB, . . . , for example robots, CNC machines, 3D printers, reactors, welding equipment, burners, heating installations or conveyor belts. The production modules PMA, PMB, . . . machine and/or assemble starting materials AP, that is to say precursors available at the start of production and required for manufacturing the product P, in order to ultimately obtain the product P.

The production system PS additionally has a control device CTL for controlling the production system PS. The control device CTL may be implemented as part of the production system PS or entirely or partly externally to the production system PS.

Controlling in this case is intended to be understood to mean in particular actuating the production modules PMA, PMB, . . . or another part of the production system PS so that they perform a desired action in the production process. Furthermore, controlling is also intended to be understood to mean outputting and using control-relevant data and control signals, that is to say data and control signals contributing to controlling the production system, in particular for the purpose of monitoring, maintenance and/or operational optimization of the production system PS and/or for the purpose of detecting wear or damage.

To control product manufacture, digital structural statements SA about a structure of the product P and/or its precursors and digital machining statements BA about machining processes required for manufacturing the product and/or its precursors are transmitted to the control device CTL. The structural statements SA can comprise what is known as a BOM (bill of materials) and the machining statements BA can comprise what is known as a BOP (bill of process).

According to embodiments of the invention the structural statements SA and the machining statements BA comprise differently detailed structural statements and machining statements. This allows the manufacture of the product P to be specified on different semantic levels or detailing levels, abstraction levels or generalization levels. A product structure or a machining process can firstly be described on a symbolic description level, that is to say with little depth of detailing, by symbolic description languages such as PDDL or OWL. For example it is thus possible to specify that the product has a base body and a cover that can be attached to the base body. Secondly, more detailed structural statements can specify the exact dimensions of the base body and the cover and indicate a position in which the cover needs to be attached to the base body. Even more detailed structural statements SA or machining statements BA can also specify where which drill holes need to be made on the base body or cover in order to attach the latter.

In general a more detailed structural statement indicates at least one further property or structure of the product compared with a less detailed structural statement or refines or breaks down one or more properties or structures already specified in the less detailed structural statement. Accordingly a more detailed machining statement indicates at least one further machining step compared with a less detailed machining statement or refines or breaks down a machining step already indicated in the less detailed machining statement. Whether a stipulated structural statement provides another structural statement with further detail can easily be established by a parser and/or by comparing structural elements.

According to embodiments of the invention, differently detailed machining sequences, that is to say machining sequences on different semantic levels, are generated from the structural statements SA and the machining statements BA and, as described below, are each supplied to a planning module specializing in the relevant semantic level.

Figure 2:
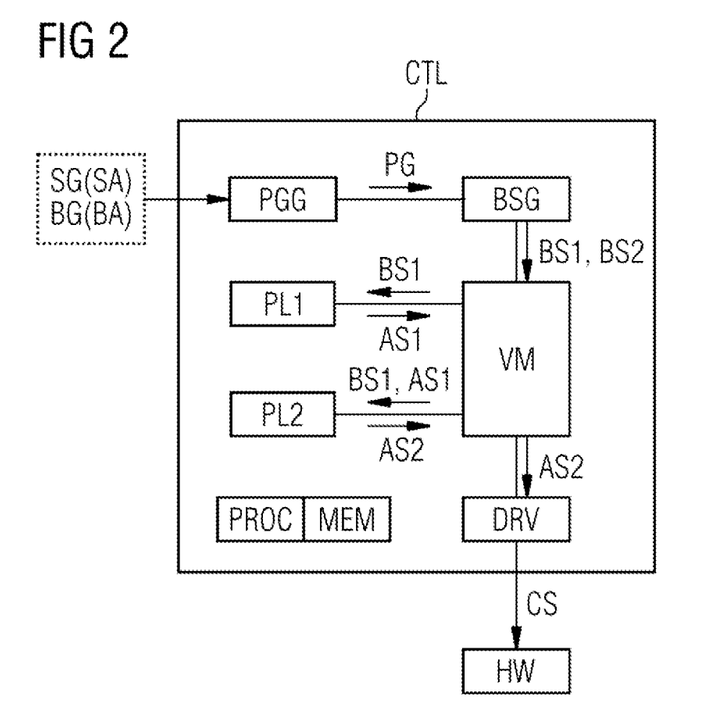
FIG. 2 shows a control device according to embodiments of the invention when controlling a production system.

The control device CTL takes the structural statements SA and the machining statements BA as a basis for generating for each of the production modules PMA, PMB, . . . a specific action sequence ASA, ASB, . . . that is used for controlling the relevant production module PMA, PMB, FIG. 2 shows a schematic depiction of a control device CTL according to embodiments of the invention when controlling a production system. The production system in this case may be implemented as described in connection with FIG. 1.

To implement the method according to embodiments of the invention the control device CTL has a computer or processor PROC for performing all the method steps and a memory MEM for storing data requiring processing in the course of the method.

The control device CTL reads in differently detailed digital structural statements SA about a structure of a product to be manufactured and/or of the precursors thereof and differently detailed digital machining statements BA about a machining process for the product and/or for the precursors thereof. The structural statements SA and the machining statements BA may be configured as described in connection with FIG. 1.

In the present exemplary embodiment the structural statements SA are transmitted to the control device CTL in the form of digital structure graphs SG and the machining statements BA are transmitted to the control device CTL in the form of digital machining graphs BG.

Figure 3:
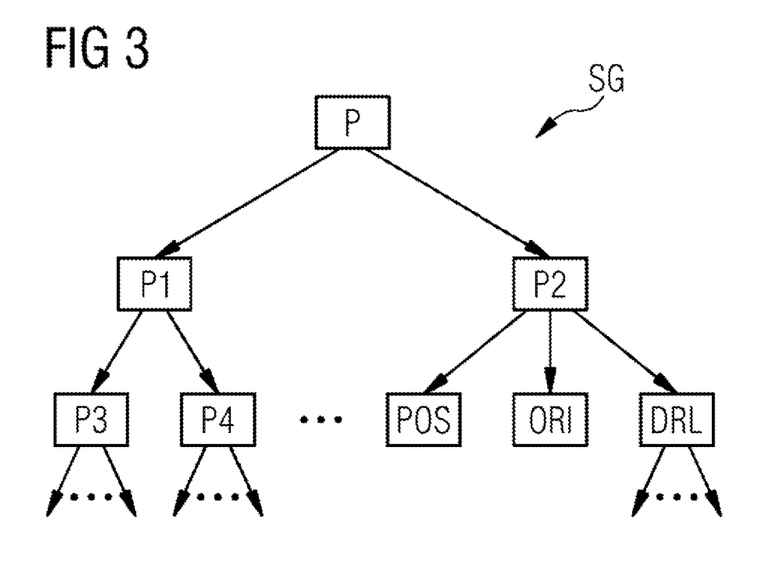
FIG. 3 shows a structure graph for storing structural statements about a product structure.

A digital structure graph SG of this kind for storing differently detailed structural statements about a structure of a product or of a precursor is schematically depicted in FIG. 3.

The structure graph SG is a directed graph having a multiplicity of nodes and references to subnodes. The structure graph SG specifies a product structure in a declarative manner on different semantic levels, detailing levels, abstraction levels, generalization levels or in different planning domains. The structure graph SG is implemented by a digital, linked data structure, by class instances within the context of object-oriented programming. The nodes of this data structure comprise structural statements that characterize a respective aspect of the structure of the product to be manufactured or machined or of a part of the product on a respective specific semantic level. The structural statements of the structure graph SG are differently detailed, as described in connection with FIG. 1.

The nodes of the structure graph SG can refer to further nodes. These references form the directed edges of the structure graph SG. The edges characterize an implementation relationship or detailing relationship between the nodes. The references in this case each point in the direction of greater detailing. That is to say that a reference from a node specifying a first product structure to a node specifying a second product structure indicates that the second product structure provides the first with further detail and/or forms a substructure of the first structure.

The structural statements of the structure graph SG in the present exemplary embodiment comprise a structural statement P about a product to be manufactured, that is to say about an end product or a product in a target state. The structural statement P therefore forms a target structural statement, which is implemented by a target instance.

The structural statement P refers to structural statements P1 and P2 about partial products of the product to be manufactured. The references in this case specify that the product is provided with further detail by the structural statements P1 and P2 about the partial products. The partial products may be for example a base body of the product and a cover of the product that is to be fitted to the base body.

Furthermore, the structural statement P1 is provided with further detail by structural statements P3, P4, . . . about further partial products and the structural statement P2 is provided with further detail by structural statements POS, ORI and DRL, this being represented by appropriately directed edges. The structural statement POS in this case specifies a target position and the structural statement ORI specifies a target orientation of the partial product P2. The structural statements POS and ORI can comprise in particular coordinate statements and angle statements. The structural statement DRL for its part describes a drill hole to be made on the partial product P2. The drill hole can also be provided with further detail by virtue of position, orientation and drill hole diameter, for which purpose there may be provision for further references to appropriate structural statements.

Figure 4:
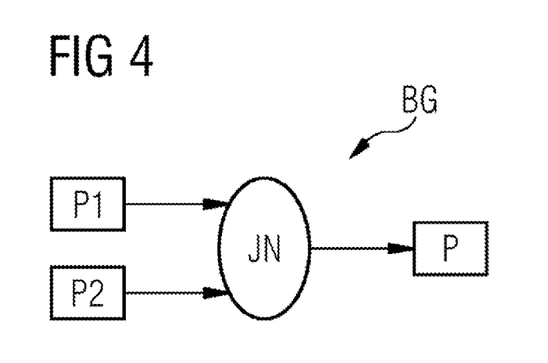
FIG. 4 shows a machining graph for storing machining statements about a machining process.

A digital machining graph BG for storing machining statements about a machining process for the product to be manufactured or for one of the precursors thereof is schematically depicted in FIG. 4.

The machining graph BG is a directed graph containing nodes and references to nodes. Such machining graphs specify capabilities of the production system and of the machining processes taking place therein. The machining graph BG specifies in particular procedural relationships between precursors and derived products resulting therefrom as a result of a machining process on a specific semantic level, detailing level, abstraction level, generalization level or in a specific planning domain. The machining graph BG is implemented by a digital linked data structure, by class instances.

The nodes of this data structure comprise machining statements about a machining process that converts at least one precursor into at least one derived product, and nodes of a structure graph that characterize the at least one precursor and the at least one derived product on the specific semantic level of the machining statement. Such machining statements are frequently also referred to as operators. Furthermore, statements about production modules that perform the relevant machining process can also be stored in the machining graph BG as nodes.

The nodes of the machining graph BG can refer to other nodes. These references form the directed edges of the machining graph BG that point in the direction of the production progress or production flow. That is to say that the node of the at least one precursor refers to the node of the machining statement, which in turn refers to the node of the at least one derived product. Insofar as a node of a structure graph—as already explained in connection with FIG. 3—can contain references to one or more other nodes of the structure graph, a node of the structure graph can represent an entire partial structure graph. For reasons of clarity, however, FIG. 4 explicitly depicts only the starting nodes of such partial structure graphs.

The machining graph BG therefore links precursors and if necessary statements about production modules to derived products and therefore specifies in particular which precursors lead to which derived products as a result of a respective machining step. In other words: the machining graph specifies the precursors needed for a machining process and the derived products resulting from the precursors.

Such machining graphs can be used to characterize machining processes on different semantic levels, detailing levels, abstraction levels, generalization levels or in different planning domains. For example on a symbolic level it is possible to indicate that a cover needs to be connected to a base body. On a subsymbolic level it is then possible to provide the further detail that drill holes need to be made on the cover and on the base body by a drill and that the cover needs to be screwed to the base body. Further machining graphs can then provide further detail regarding precisely where the drill holes and screws need to be placed.

In the illustrative machining graph BG shown by FIG. 4 a digital machining statement JN forms a node that specifies a joining of precursors to produce an assembled product as derived product. The precursors in the present exemplary embodiment are formed by the partial products P1 and P2, which refer to the node of the machining statement JN, which in turn refers to the node P of the product to be manufactured as derived product. The above data structure specifies that the partial products P1 and P2 are able to be joined to one another and that the resulting joined object is the product P.

The structural statements about the precursors or the derived product or products that are required for performing the machining step specified by the machining statement, in the present case JN, can be taken from the structure graphs of the precursors and derived products, in the present case P1, P2 and P, on the detailing level required for the machining statement JN.

As FIG. 2 also shows, the structure graphs SG and the machining graphs BG are supplied to a production graph generator PGG of the control device CTL. The production graph generator PGG generates a digital production graph PG from the structure graphs SG and the machining graphs BG. The production graph PG is generated specifically for a product that currently needs to be manufactured and machined and for currently available production modules of the production system PS.

Figure 5:
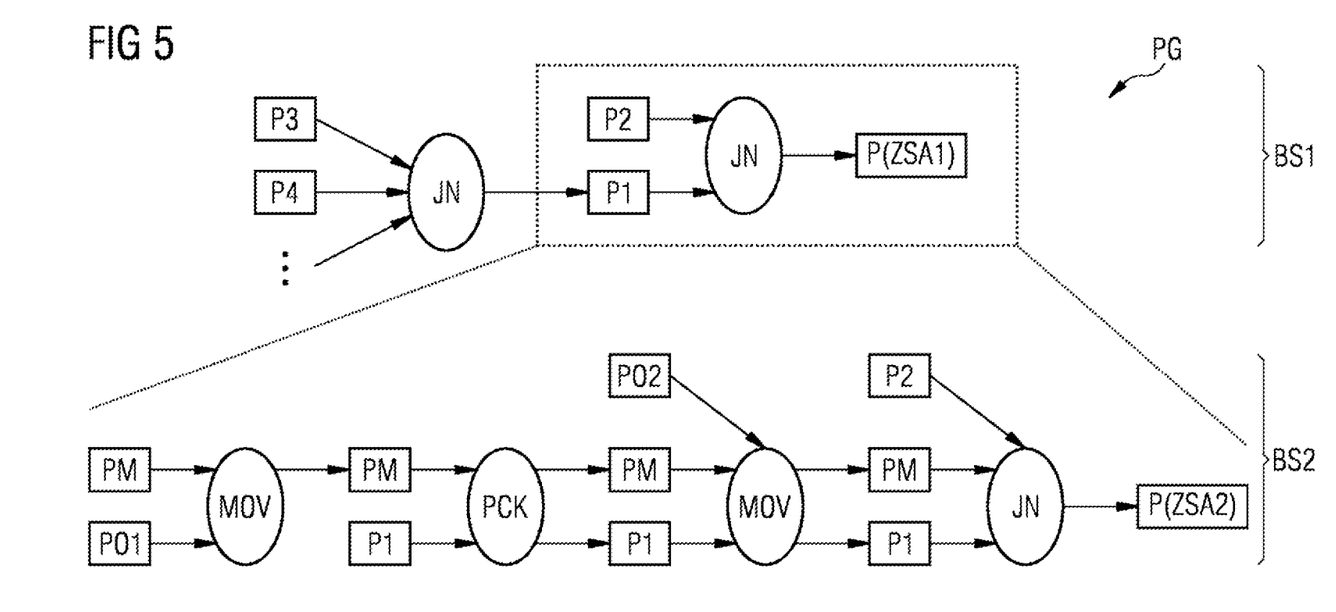
FIG. 5 shows a detail from a production graph according to embodiments of the invention.

FIG. 5 shows a detail from a production graph PG according to embodiments of the invention in a schematic depiction. The production graph PG is a directed graph containing nodes and references to nodes or partial graphs that is implemented by a linked data structure, by class instances.

The nodes of this data structure comprise nodes of structure graphs and nodes of machining graphs, which may be implemented as described above. Insofar as the nodes of structure graphs and machining graphs refer to other nodes if appropriate, the nodes of the production graph PG can each represent an entire partial structure graph or partial machining graph. For reasons of clarity, FIG. 5 depicts only one representative node in each case for such partial structure graphs and partial machining graphs; that is to say that although the references between nodes of structure graphs that are described in connection with FIG. 3 and point in the direction of finer detailing are present in the production graph PG, they are not explicitly depicted in FIG. 5.

The check to determine whether a first node of a structure graph provides a second node of a structure graph with further detail establishes whether a partial structure graph based on the first node contains a partial structure graph based on the second node and/or whether the second node succeeds the first node in the structure graph or production graph PG in respect of a reference structure. This can easily be established by a parser and/or by comparing data structures. Alternatively or additionally, nodes of a structure graph can each comprise an attribute that indicates a degree of detailing, a semantic level or a planning domain. On the basis of this check a reference from the first node to the second mode is produced. In many cases, however, a reference structure of a respective structure graph can be adopted for the production graph PG.

The edges of the production graph PG that are depicted in FIG. 5 and run between nodes of structural statements and nodes of machining statements refer—as explained in connection with FIG. 4—in the direction of the production cycle. The machining graphs involved, or the nodes thereof, are therefore linked according to the production cycle. In many cases these references can be adopted by the machining graphs involved.

In the present exemplary embodiment the production graph PG comprises a structural statement PM about a robot arm as a production module of the production system and a structural statement P about a product to be manufactured or machined. The structural statement P in this case specifies a target state of the product by differently detailed target structural statements ZSA1 and ZSA2, the target structural statement ZSA1 being provided with further detail by the target structural statement ZSA2.

Furthermore, the production graph PG comprises structural statements P1, P2, P3, P4, . . . about partial products of the product that specify for example a base body, a cover to be placed thereon and further parts of the product. The production graph PG also contains structural statements PO1 and PO2 about positions and/or orientations of the robot arm.

The reference signs for the structural statements PM, PO1, PO2, P, P1, P2, . . . are also used below for the production modules, positions, products and partial products represented thereby.

In addition, the production graph PG comprises machining statements JN, MOV and PCK about machining steps to be performed. In detail, the machining statement JN specifies a joining of precursors to produce an assembled derived product, the machining statement MOV specifies a moving of the robot arm PM to a target position specified by a structural statement, in this case PO1 and PO2, and the machining statement PCK specifies a picking-up of a specified partial product by the robot arm.

The production graph PG comprises multiple digital machining sequences on different semantic levels, detailing levels, abstraction levels, generalization levels or planning domains as partial graphs. For reasons of clarity, FIG. 5 schematically depicts only two illustrative machining sequences BS1 and BS2.

The machining sequences BS1 and BS2 are each formed from structure graphs and machining graphs as a succession of structural statements and machining statements. A respective succession in this case specifies a succession of precursors, operators and derived products on a detailing level specific to machining sequences, the derived products in turn acting as precursors for one or more further operators while they do not yet result in the finished product, in this case P.

In the present exemplary embodiment the machining sequence BS1 is provided with further detail by the machining sequence BS2. The entire production graph PG therefore specifies the machining and/or manufacturing steps for the product P on different semantic planning levels or detailing levels.

The machining sequence BS1 assigned to a higher, that is to say less detailed, planning domain specifies a joining of the partial products P3, P4, . . . by the machining statement JN to produce the partial product P1, and joining of the latter to the partial product P2 by a further machining statement JN to produce the end product P. A planning module responsible for this planning domain can restrict itself on this planning level to finding suitable starting and/or target poses that lead to no collisions, for example.

The partial sequence highlighted by a dotted rectangle in the machining sequence BS1 in FIG. 5 is provided with further detail by the machining sequence BS2. In the present exemplary embodiment the machining sequence BS2 specifies a moving MOV of the robot arm PM to the position PO1, a picking-up PCK of the partial product P1, a moving MOV of the robot arm PM with the partial product P1 to the position PO2 and a joining of the partial product P1 to the partial product P2 to produce the end product P. In contrast to the machining statements of the machining sequence BS1, the machining statements of the machining sequence BS2 specify and quantify specific actions of the robot arm when performing a respective machining step. For this planning domain it is possible to use a planning module that accomplishes the applicable planning task by calculating specific collision-free trajectories.

Above or below the machining sequences BS1 and BS2 there may be provision for one or more further coarser or finer detailing levels. As such, the production graph PG can comprise for example a further, more detailed machining sequence in which the collision-free trajectories are optimized for example in respect of a performance speed.

As FIG. 2 also shows, the production graph PG generated by the production graph generator PGG is transmitted to a machining sequence generator BSG. The latter is coupled to the production graph generator PGG and selects multiple machining sequences, in the present case BS1 and BS2, from the transmitted production graph PG.

For this purpose, the target structural statements ZSA1 and ZSA2 are first selected in the production graph PG. The target structural statements ZSA1 and ZSA2 specify a target state of the product P, that is to say a state to which the product P needs to be brought by the production system PS, on different semantic levels, detailing levels, abstraction levels, generalization levels or planning levels. The target structural statements are selected by gradually ascending higher from the most detailed target structural statement, in the present case ZSA2, in the production graph PG to less detailed target structural statements, in the present case ZSA1, in the associated structure graph, in the present case P, counter to the direction of the edges.

A machining sequence, in the present case BS2 or BS1, is generated for each of the target structural statements found in this manner, in the present case ZSA2 and ZSA1, with the respective detailing level or semantic level of the target structural statement defining the planning domain of the respectively generated machining sequence. That is to say that the planning domain, semantic level or detailing level of the respective resultant machining sequence is to a certain extent "set" on the basis of the finished product.

A respective machining sequence BS1 or BS2 is generated by progressively reversing in the production graph PG counter to the direction of the edges from derived products via machining statements in the direction of the precursors through to the starting materials based on the respective target structural statement ZSA1 or ZSA2 on the same detailing level. The accordingly continuous partial graph of the production graph PG is then output as machining sequence BS1 or BS2. The generation of a respective machining sequence BS1 or BS2 is terminated as soon as all starting points for the hitherto continuous partial graph then comprise only starting materials in an initial state. In this case a respective machining sequence BS1 or BS2 contains a complete path from the starting materials to the end product.

Advantageously, the machining sequences BS1 and/or BS2 can also be generated on the basis of current production conditions, ambient conditions and/or secondary conditions or on the basis of a number of edges of a partial graph of the production graph PG. This allows production to be coordinated with different production conditions in a flexible manner.

The machining sequences BS1 and BS2 are transmitted from the machining sequence generator BSG to a distribution module VM coupled thereto. The distribution module VM is coupled to multiple planning modules PL1 and PL2, specializing in a respective planning domain, detailing level or semantic level, for the purpose of domain-specific action planning and action optimization. The planning domain of the planning module PL2 is more detailed than the planning domain of the planning module PL1 in this case. The term planning domain in this case denotes in particular a semantic level, a detailing level, an abstraction level or a generalization level or generally a class of digital planning tasks. In this context the distribution module can be regarded as a meta planning module to a certain extent.

Such planning modules are also referred to as planners below. For reasons of clarity, FIG. 2 explicitly depicts only two planners PL1 and PL2. In general there may also be provision for three or more planners. For domain-specific action planning a multiplicity of planners are available for different planning domains, for example action planners, movement planners or detection planners.

The distribution module VM transmits the machining sequence BS1 to the planner PL1 and the machining sequence BS2 to the planner PL2, in each case as part of a domain-specific planning task to be accomplished.

A planning task in this case generally comprises a machining sequence leading from one or more starting materials or initial states together with a description of the production means available for performing the machining sequence and/or of the available production conditions. The latter can be specified or quantified for example by surroundings data, sensor data and/or secondary conditions for the production process.

Based on the set planning task the respective planner attempts to find an action sequence, optimized according to a stipulated criterion, that leads from the initial state via the machining sequence to the target state within the framework of the available production means and/or production conditions. The stipulated criterion in this case can relate for example to a time requirement, a resource consumption, a wear and/or emissions from the production system.

An action sequence comprises digital control instructions for components of the production system, for example for robots, conveyor belts, welding equipment, cameras or other production modules, in order to perform a specific production process. An action sequence can comprise in particular digital control instructions for positioning, moving and/or gripping robot arms, for joining multiple partial products, for drilling, grinding or welding or for controlling other machining actions. If an action sequence that accomplishes the set planning task is found it is transmitted from the respective planner to the distribution module VM as a planning result.

The distribution module VM progressively calls the planners, in the present case PL1 and PL2, with increasing degree of detailing and also transmits planning results of a preceding planner to the next planner with the respective planning task. This allows the planning to be progressively refined from an abstract, symbolic planning level to a specific planning level that specifies all the details required for production.

In embodiments of the invention, the distribution module VM first calls the planner PL1 with the planning task comprising the machining sequence BS1. The planner PL1 consequently attempts to find in the planning domain associated with the machining sequence BS1 an action sequence AS1 that can accomplish or implement the machining sequence BS1. On this detailing level the sought action sequence AS1 can comprise for example suitable starting and target poses that lead to no collisions and/or qualitatively indicate that a cover needs to be placed on a base body. The action sequence AS1 found is transmitted as a planning result of the planner PL1 from the latter to the distribution module VM.

Next the distribution module VM calls the planner PL2 with the planning task comprising the machining sequence BS2, the action sequence AS1 found additionally being transmitted to the planner PL2 and taken into consideration in the planning thereof. The planner PL2 consequently attempts to find in the planning domain associated with the machining sequence BS2 an action sequence AS2 that can accomplish or implement the machining sequence BS2. On this detailing level the sought action sequence AS2 can take the action sequence AS1 as a basis for quantifying for example specific collision-free trajectories for the action sequence AS1, such as for example the specific movements and gripping actions of a robot arm for placing the cover on the base body. The action sequence AS2 found is transmitted as a planning result of the planner PL2 from the latter to the distribution module VM.

In the manner described above the planning result of the planner PL1 is refined by the planning result of the planner PL2 during generation of the action sequence AS2 thereof. Insofar as each planner, in the present case PL1 or PL2, takes into consideration only its own planning space and the results of a respective preceding planner it is possible for cross-domain optimization to be accomplished, which requires significantly less processing effort compared with global optimization over all planning spaces.

If the planner PL1 or PL2, based on the stipulated constraints, cannot find an action sequence for performing the respective machining sequence or discovers another error, corresponding error information is transmitted to the distribution module VM. As a result of receiving this error information the distribution module VM can be prompted to call one or more planners with a modified planning task and to execute the above planning process again. In particular it is possible to call a planner associated with a higher planning domain than the planner for which the error has occurred. Alternatively or additionally, as a result of receiving the error information the distribution module VM can prompt the machining sequence generator BSG to generate one or more new machining sequences, in particular with a lower degree of detailing and/or with modified secondary conditions, and to execute the planning process again with these machining sequences.

The above-described regeneration of action sequences and/or machining sequences can also be prompted by the distribution module VM on the basis of a check on the action sequences AS2 or AS1. The checking criterion used in this case can be for example a time requirement, a resource consumption, a material consumption and/or a wear that would be caused by the generated action sequences.

The distribution module VM also checks a performability of the action sequence AS2 by the production system. As soon as a performable action sequence AS2 is available, specific action sequences for the individual production modules involved are derived from the action sequence and transmitted to hardware drivers DRV of these production modules. The hardware drivers DRV generate specific control signals CS from the production-module-specific action sequences for the purpose of controlling the specific production modules. The control signals CS are finally transmitted from the hardware drivers DRV to applicable hardware components HW of the production system in order to manufacture the product P.

The segmentation of the production graph PG into partial graphs, in the present case BS1 and BS2, and the subsequent partial-graph-specific action planning and/or optimization allow the processing effort required for the planning to be significantly reduced. This applies in particular because efficient and specialized planning modules for domain-specific action optimization are available for many specific planning domains. In many cases this allows production planning and production optimization to take place in real time during production or machining of the product P.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for manufacturing a product by a production system, the method comprising:
    reading in differently detailed, digital structural statements about a structure of the product or of a precursor of the product and digital machining statements about a machining process for the product or for a precursor of the product;

checking the structural statements to determine whether a respective structural statement is provided with further detail by a respective other structural statement;

generating multiple machining sequences for the product from the structural statements and machining statements such that a first structural statement comprising a first machining sequence is provided with further detail by a second structural statement comprising a second machining sequence;

transmitting the first machining sequence to a first planning module and transmitting the second machining sequence to a second planning module;

generating, by the first planning module using the first machining sequence, an action sequence;

transmitting the action sequence output by the first planning module to the second planning module;

generating, by the second planning module, a new action sequence that takes into consideration the action sequence output by the first planning module and the second machining sequence, such that the action sequence output by the first planning module is refined by the second planning module to generate the new action sequence; and generating and outputting control signals for controlling the production system using the new action sequence generated by the second planning module.

2. The method as claimed in claim 1, wherein the structural statements are stored as nodes in one or more digital structure graphs.

3. The method as claimed in claim 2, wherein the checking is a check to determine whether a first structural statement is provided with further detail by a second structural statement, and involves checking whether a partial structure graph based on a node of the first structural statement contains a partial structure graph based on a node of the second structural statement, and/or whether the node of the second structural statement succeeds the node of the first structural statement in a structure graph in respect of a reference structure thereof.

4. The method as claimed in claim 1, wherein the structural statements each comprise an attribute that indicates a degree of detailing, and in that the checking is performed on a basis of the attribute.

5. The method as claimed in claim 1, wherein the structural statements and the machining statements are each stored as nodes in a digital production graph such that a respective structural statement that provides a respective other structural statement with further detail succeeds the other structural statement in the production graph in respect of a reference structure thereof.

6. The method as claimed in claim 5, wherein the machining sequences are each generated as a partial graph of the production graph.

7. The method as claimed in claim 1, wherein target structural statements that each specify a target state of the product are selected from the structural statements, and in that the machining sequences are generated such that a target structural statement comprising the first machining sequence is provided with further detail by a target structural statement comprising the second machining sequence.

8. The method as claimed in claim 7, wherein the generating of a respective machining sequence involves the respective machining sequence being progressively assigned at least one structural statement and at least one machining statement based on a respective target structural statement, the statements specifying a conversion of at least one precursor into the respective target state by at least one machining process.

9. The method as claimed in claim 8, wherein the generation of a respective machining sequence is terminated as soon as all starting points for the machining sequence comprise only stipulated starting materials.

10. The method as claimed in claim 1, wherein the new action sequence output by the second planning module is rated on a basis of a stipulated criterion, which is taken as a basis for prompting the first planning module to generate a further action sequence and/or a new machining sequence to be generated.

11. The method as claimed in claim 1, wherein if a planning module or a hardware driver of the production system reports an error then a new machining sequence is generated taking into consideration the error.

12. The method as claimed in claim 1, wherein the new action sequence is output together with an associated detailing statement.

13. A control device for controlling a production system, configured to carry out the method as claimed in claim 1.

14. A computer program product, comprising a computer readable hardware storage device having computer readable program code stored therein, said program code executable by a processor of a computer system to implement the method as claimed in claim 1.

15. A computer-readable storage medium containing a computer program product as claimed in claim 14.

* * * * *